Feb. 15, 1966 — W. W. STOOTHOFF — 3,234,848
FILM VIEWER
Filed Feb. 18, 1963 — 2 Sheets-Sheet 1

INVENTOR.
WILLIAM W. STOOTHOFF
BY
Dick, Zarley + Henderson
ATTORNEYS

WITNESS
NORMAN G. TRAVISS

Feb. 15, 1966   W. W. STOOTHOFF   3,234,848
FILM VIEWER
Filed Feb. 18, 1963   2 Sheets-Sheet 2
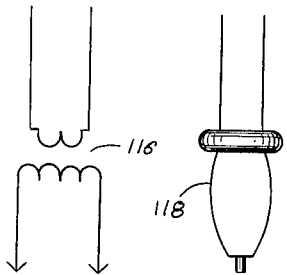
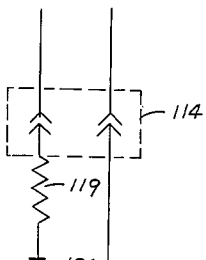
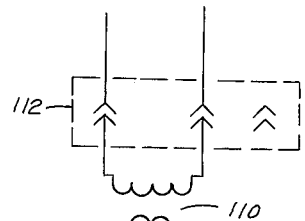
*Fig. 3*   *Fig. 4*
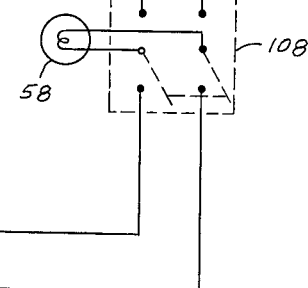
*Fig. 5*
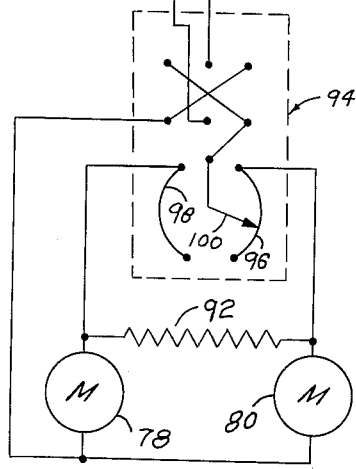
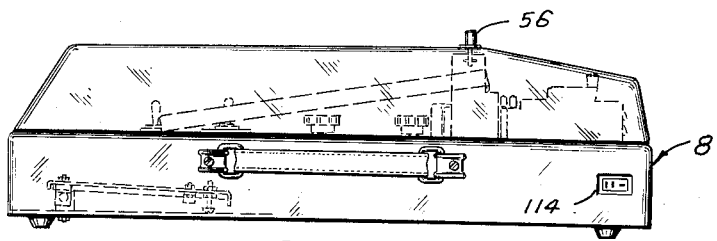
*Fig. 6*
INVENTOR.
WILLIAM W. STOOTHOFF
BY
Dick, Zarley + Henderson
WITNESS
NORMAN G. TRAVISS
ATTORNEYS

United States Patent Office 3,234,848
Patented Feb. 15, 1966

3,234,848
FILM VIEWER
William W. Stoothoff, Ramsey, N.J., assignor to Micro-Fax Service, Inc., Perry, Iowa
Filed Feb. 18, 1963, Ser. No. 259,023
3 Claims. (Cl. 88—24)

This invention relates to film viewers and particularly a portable microfilm viewer.

Microfilm viewers herebefore have ordinarily been of the stationary type for office use primarily, and consequently quite large and unsuited for transporting between several points of use. Furthermore, the office microfilm viewer would operate off of one hundred ten volt A.C. line power and accordingly would be inoperative if this power was unavailable, e.g., in an automobile, out of doors, or in a room having no electrical outlets. Therefore, it is an object of this invention to provide a microfilm viewer that is suitable for use in office, classroom, laboratory, lecture hall, conference room, automobile, out of doors, etc.

A further object of this invention is to provide a microfilm viewer which will operate on battery power or on ordinary line voltage, in combination with battery power.

It is a further object of this invention to provide a microfilm viewer which is readily set up for use and disassembled for transporting.

It is a further object of this invention to provide a microfilm viewer having a variable speed control both in forward and backward directions.

It is a further object of this invention to provide a microfilm viewer having two motors for the operation of microfilm reels to maintain the desired tension in the films at all times.

It is a further object of this invention to provide a microfilm viewer having batteries which may be readily recharged after extended use.

It is a further object of this invention to provide a microfilm viewer having two motors wherein one of the motors will act as a brake on the prime moving motor and the function of each motor may be alternated as desired.

Another object of this invention is to provide a film viewer which is economical to manufacture and durable in nature and effective in its intended purpose.

Various other objects and advantages will appear from the following description of one embodiment of the invention and the novel features will be particularly pointed out hereinafter in connection with the appended claims and illustrated in the accompanying drawings, in which:

FIG. 3 is a schematic representation of the battery charger;

FIG. 4 illustrates a plug suitable for insertion in a cigarette lighter and connected to the device as a source of electrical power;

FIG. 5 is a schematic drawing illustrating the electrical wiring of the device; and FIG. 6 is a side view of the device with its lid closed on the chassis and further indicating by the dotted lines the internal component parts as they appear in the closed condition.

Figure 1:
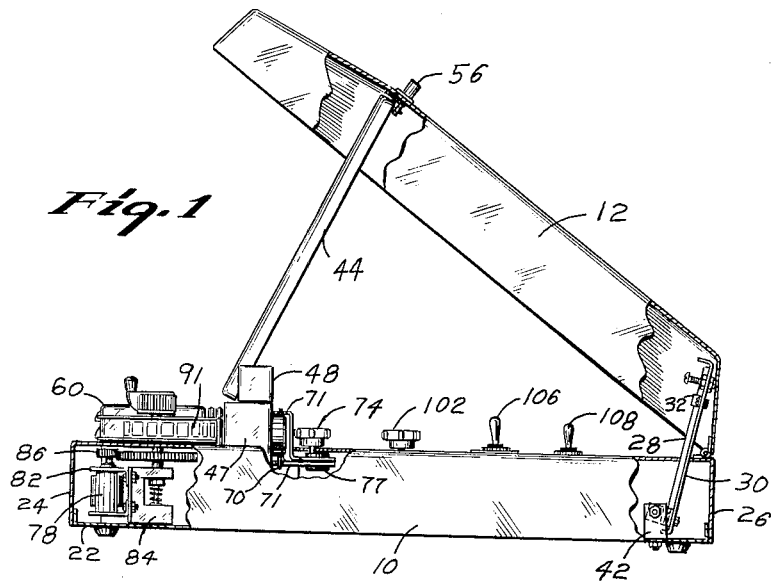
FIG. 1 is a side view of the device with portions of the chassis and lid cut away to more fully illustrate the relationship of the screen and mirror to the lid during operation; and to show the motor and gear arrangement for driving the tape reels.
Figure 2:
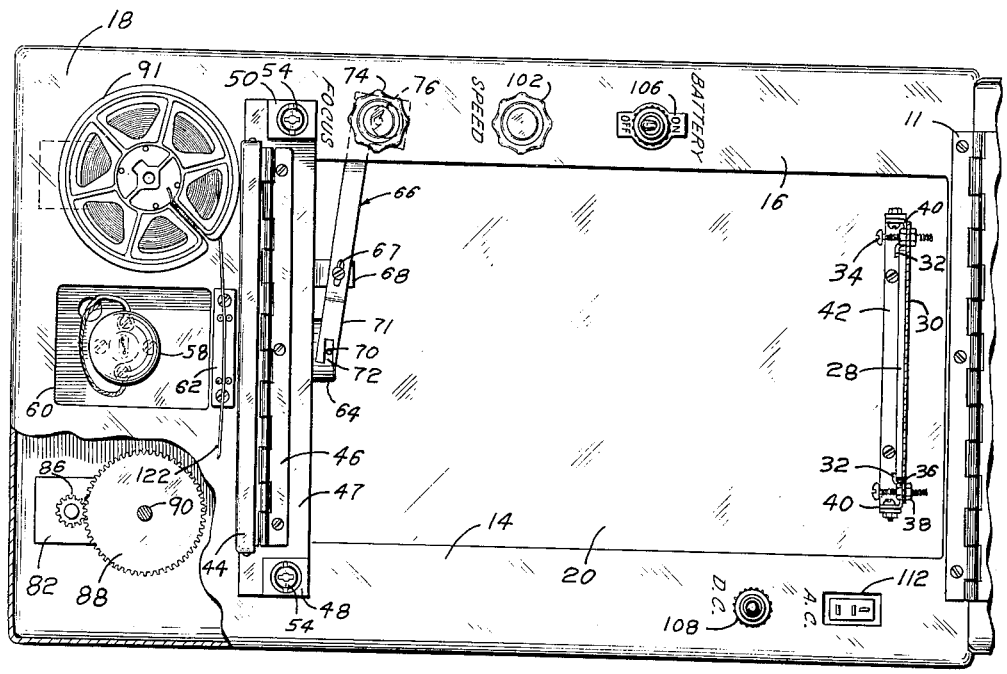
FIG. 2 is a top view of the device illustrating through a cut away portion the gearing arrangement (the screen and mirror are shown extending perpendicular to the chassis only for the purpose of illustrating elements of the invention otherwise obscured)

The following description describing the invention in detail refers to the film viewer generally by the numeral 8. The film viewer 8 comprises a chassis 10 being hingedly connected by hinge 11 to a lid 12, as best illustrated in FIGS. 1 and 2. The chassis 10 comprises top side portions 14 and 16 as illustrated in FIG. 2, top end portion 18 opposite the end hinged to the lid 12 thereby forming the sides of a cavity 20. Cavity 20 has a base 22 and extends under the top end portion 18 to the end wall 24, and in the opposite direction to the end wall 26.

A mirror 28 having a back member 30 secured thereto at the top thereof by clips 32 is mounted on the base 22 transversely of the length of the cavity 20. A bolt 34 having nuts 36 and 38 on opposite sides of the back member 30 is adjustable for movement of the mirror relative to the end of the lid adjacent its hinged connection to the chassis 10. A clip 40 on opposite sides of the mirror and at the lower edge thereof is used to secure the mirror to the back member 30 and pivotally connect the same to a U-shaped bracket 42 mounted on the base 22 of the chassis 10.

At the end of the chassis opposite the mirror is a translucent screen 44 mounted by hinged connection 46 to a screen block 47 resting on the side portions 14 and 16 of the chassis 10. Mounted on top of the screen block 47 and at opposite ends thereof are latch blocks 48 and 50. Socket elements 54 are formed in the top side of the latch blocks 48 and 50 to receive the latch members 56 secured to the lid 12.

A projector lamp 58 having a cover 60 is mounted on the base 22 and vertically projects through the top end portion 18 of the chassis 10. A film guide 62 is mounted transversely of the chassis between a lens 64 and the projector lamp 58. Pins 65 are mounted on the top and bottom sides of lens 64. A focus lever 66 has a portion intermediate its ends with an elongated opening 67. A pin in the opening 67 pivotally and slidably connects the focus lever to a fulcrum member 68. The focus lever 66 at its inner end comprises arms 71 having slotted ends 72 for engagement with pins 65. A focus control knob 74 mounted on the top side portion 16 has a pin 76 eccentrically and fixedly connected to a cylindrical cam 77 which is adapted to rotate within an opening formed in the outer end of the focus lever 66. Thus, rotation of the control knob 74 will cause the lens 64 to move inwardly and outwardly for the desired focus.

A pair of motors 78 and 80 one of which is illustrated in FIG. 1 and represented in the schematic drawing FIG. 5 are mounted on motor brackets 82 in turn secured to a motor block 84. A gear 86 on each of the motors 78 and 80 operates a gear 88 on their respective drive shafts 90. Drive shafts 90 are in turn connected to tape reels 91.

In the schematic drawing (FIG. 5) of the electrical wiring, it will be seen that one source of a power supply is connected to one terminal of each of the motors 78 and 80. The other terminal of the motors is connected to opposite ends of a resistor 92. The motors may have a rating of from six to twelve volts and the resistor twenty-five ohms and one-half watt. Also connected to the opposite ends of resistor 92 is a reversing rheostat generally referred to by the numeral 94. The rheostat coil 96 is connected to one side of the resistor 92 for operation of motor 80 and rheostat coil 98 is connected to the other side of resistor 92 for operation of motor 78. A pick off element 100 is adapted to move to an off position between rheostats 96 and 98 to a position of operation as illustrated in FIG. 5, wherein power will be selectively delivered to either of the motors 78 and 80. As illustrated in FIG. 5, the pick off element is in contact with the rheostat 96 for operation of motor 80. The pick off element 100 is manually operated by rheostat knob 102. The power supply for operation of the device may be a silver cadmium six volt battery 104. In this event, switch 106 is closed and the double pole-double throw switch 108, adapted to operate the projector lamp 58, is moved to the position represented by the broken lines in FIG. 5. As described, both the projector lamp and the motors will be operated by the battery power. In the event that one hundred ten line voltage is available and desirable, the lamp 58 may be operated by moving the switch 108 in the opposite direction as illustrated by the broken lines in FIG. 5. Electrical power will be supplied to the lamp through a transformer coil 110. The transformer coil may have one hundred fifteen volt primary and five volt secondary. One rheostat that may be used in this device is a 50 ohm motor control rheostat.

After extended use of the six volt silver cadmium battery 104, it will be necessary to either replace the battery or recharge it. The outlet 112 illustrated in FIG. 2 and FIG. 5 is adapted to receive one hundred ten volt, sixty cycle power and the outlet 114 illustrated in FIG. 6 and FIG. 5 is adapted to receive power from a battery charger 116, as illustrated in FIG. 3, or the plug 118 (illustrated in FIG. 4) connected to a cigarette lighter outlet. A four ohm, ten watt resistor 119 is placed in series with a silicone rectifier 120 between the outlet 114 and the battery 104.

Referring now to FIGS. 1 and 6, the operation of the lid relative to the screen 44 and the mirror 28 will be explained. When the lid is raised, the screen 44 rests at its outer end against the latch 56. The mirror 28 is pivoted by adjusting bolt 34 bearing against the end of the lid. When the mirror is properly aligned, it will receive the light beam from the lamp 58 through the lens 64 for reflection to the screen 44. The bolt 34 engages the rear end of the lid 12 to accomplish this adjustment.

Referring now to the schematic drawing of FIG. 5, it will be seen that as the resistance in the rheostat 96 is reduced, the power and speed of the motor 80 will be proportionately increased. The power and speed of the motor 78 will be smaller due to the voltage drop across the resistor 92. When the pick off element is in contact with the rheostat 98, a similar operation will be accomplished, however, the motors will operate in the opposite direction from that when the pick off element is in contact with the rheostat 96. It is to be noted that at all times both motors are operating, one however slower at a lower rate of speed than the other to maintain constant tension in the film 122.

It will be understood that various changes in the details, materials, steps and arrangements of parts, which have been herein described and illustrated in order to explain the nature of the invention, may be made by those skilled in the art within the principle and scope of the invention as expressed in the appended claims.

I claim:
1. In a film viewer,
a chassis,
a projection lamp mounted at one end of said chassis,
a lens mounted on said chassis in alignment with and adjacent to said lamp,
a mirror adjustably mounted at the other end of said chassis to receive a beam of light from said lamp through said lens,
a screen at said one end of said chassis and adapted to receive the reflection of said light beam from said mirror,
a pair of motors and associated film storage means positioned on opposite sides of said lamp and lens,
said motors connected on one side to one side of a source of D.C., the other pole of said motors connected to opposite sides of a resistor,
a reversing rheostat connected to the opposite sides of said resistor and to the other side of said source of D.C., and
said rheostat adapted to selectively operate one of said motors at high and low rates of speed relative to the speed of the other motor.

2. In a film viewer,
a chassis,
a projection lamp mounted at one end of said chassis,
a lens mounted on said chassis in alignment with and adjacent to said lamp,
a mirror adjustably mounted at the other end of said chassis to receive a beam of light from said lamp through said lens,
a screen at said one end of said chassis and adapted to receive the reflection of said light beam from said mirror,
a pair of motors and associated film storage means positioned on opposite sides of said lamp and lens,
said motors connected on one side to one side of a source of electrical power, the other pole of said motors connected to opposite sides of a resistor,
a reversing rheostat connected to the opposite sides of said resistor and to the other side of said source of electrical power, and
said rheostat adapted to selectively operate one of said motors at high and low rates of speed relative to the speed of the other motor.

3. In a film viewer,
a chassis, said chassis having a bottom wall with upstanding side walls along its length and flange portions extending inwardly towards each other in parallel relationship to said bottom wall,
a projection lamp mounted at one end of said chassis,
a lens mounted on said chassis in alignment with and adjacent to said lamp,
a mirror pivotally mounted to said bottom wall at the other end of said chassis to receive a beam of light from said lamp through said lens,
a screen pivotally mounted to said one end of said chassis and adapted to receive the reflection of said light beam from said mirror,
a lid pivotally engaging at one end the other end of said chassis and extending upwardly and forwardly therefrom in an open position,
a stop means adjacent the other end of said lid and adapted to support the outer end of said screen,
said screen adapted to hold said lid in said open position,
said screen and said mirror when said lid is in a closed position being pivoted downwardly with said screen resting at its outer end on said flanges and said mirror resting on said bottom wall of said chassis, and
said mirror when said lid is in said open position adapted to be pivoted upwardly with its outer end resting against said lid to hold said mirror in its position of use.

References Cited by the Examiner

UNITED STATES PATENTS

| 1,620,768 | 3/1927 | Joy | 88—24 |
|---|---|---|---|
| 1,671,449 | 5/1928 | Readeker | 88—28.91 |
| 2,265,859 | 12/1941 | Rinaldy | 88—24 |
| 2,322,023 | 6/1943 | Hopkins. | |
| 2,412,551 | 12/1946 | Pratt et al. | |
| 2,624,231 | 1/1953 | Kingston. | |

FOREIGN PATENTS 380,968    9/1923    Germany.

NORTON ANSHER, *Primary Examiner.*
WILLIAM MISIEK, *Examiner.*